United States Patent
Marsolek et al.

(10) Patent No.: US 10,308,440 B2
(45) Date of Patent: Jun. 4, 2019

(54) SYSTEM AND METHOD FOR MANAGING SPEED OF COLD PLANER CONVEYOR BELT

(71) Applicant: CATERPILLAR PAVING PRODUCTS INC., Brooklyn Park, MN (US)

(72) Inventors: John Lee Marsolek, Watertown, MN (US); Jacob John McAlpine, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 45 days.

(21) Appl. No.: 15/790,222

(22) Filed: Oct. 23, 2017

(65) Prior Publication Data

US 2019/0119047 A1   Apr. 25, 2019

(51) Int. Cl.
*B65G 43/08* (2006.01)
*B65G 67/08* (2006.01)
(Continued)

(52) U.S. Cl.
CPC ............ *B65G 43/08* (2013.01); *B65G 67/08* (2013.01); *E01C 19/08* (2013.01); *E01C 23/065* (2013.01);
(Continued)

(58) Field of Classification Search
CPC ......... B65G 43/08; B65G 67/08; E01C 19/08; E01C 23/065; E01C 23/088; F16H 7/023; F16H 55/36
(Continued)

(56) References Cited

U.S. PATENT DOCUMENTS 4,828,103 A * 5/1989 Fauth, Sr. .............. B65G 13/06
198/781.06
4,929,121 A * 5/1990 Lent ...................... E01C 23/088
299/1.5
(Continued)

FOREIGN PATENT DOCUMENTS

WO   WO 2015/034497   3/2015

*Primary Examiner* — Douglas A Hess
(74) *Attorney, Agent, or Firm* — Finnegan, Henderson, Farabow, Garrett & Dunner, LLP

(57) ABSTRACT

A system and method for determining and controlling a speed of a conveyor belt configured for transferring material from a source of the material to a haul vehicle includes a motor and associated head pulley shaft operatively coupled to a conveyor belt head pulley configured for driving the conveyor belt. The motor is connected to a conveyor belt tensioner block configured to enable adjustment of a tension in the conveyor belt, and the head pulley shaft is rotatably supported within the conveyor belt tensioner block. A speed ring gear is mounted on the head pulley shaft and located at least partially within a bore through the conveyor belt tensioner block. A speed sensor is mounted on the conveyor belt tensioner block in a position radially outward from teeth of the speed ring gear as the speed ring gear and head pulley shaft rotate within the bore through the belt tensioner block. The speed sensor is configured to generate signals indicative of the speed of rotation of the head pulley shaft and speed ring gear. A system controller determines a speed of the conveyor belt from the speed of rotation of the head pulley shaft and speed ring gear, and controls the speed of the conveyor belt to control an amount and rate of transfer of material along the conveyor belt from the source of material to the haul vehicle during a time period.

20 Claims, 6 Drawing Sheets

(51) Int. Cl.
  *E01C 19/08* (2006.01)
  *F16H 55/36* (2006.01)
  *E01C 23/088* (2006.01)
  *E01C 23/06* (2006.01)
  *F16H 7/02* (2006.01)
  *F16H 35/10* (2006.01)
  *G01F 13/00* (2006.01)
  *G05B 19/04* (2006.01)

(52) U.S. Cl.
  CPC ........... *E01C 23/088* (2013.01); *F16H 7/023* (2013.01); *F16H 55/36* (2013.01); *F16H 2035/106* (2013.01); *G01F 13/003* (2013.01); *G05B 19/0405* (2013.01)

(58) Field of Classification Search
  USPC ... 198/341.09, 464.1, 502.4, 810.01, 810.04, 198/813; 701/50
  See application file for complete search history.

(56) References Cited

U.S. PATENT DOCUMENTS

| | | | | |
|---|---|---|---|---|
| 5,318,378 A * | 6/1994 | Lent | ...................... | E01C 23/088 404/75 |
| 6,066,809 A | 5/2000 | Campbell et al. | | |
| 6,497,320 B2 * | 12/2002 | Kondo | ................... | B65B 65/02 198/341.01 |
| 6,497,634 B1 * | 12/2002 | Bode | ........................ | F16H 3/42 474/139 |
| 6,640,158 B1 * | 10/2003 | Brandt, Jr. | ................ | G01F 1/30 177/116 |
| 7,470,082 B2 | 12/2008 | Lloyd | | |
| 7,624,857 B2 * | 12/2009 | Kusel | ................... | B65G 43/02 198/502.4 |
| 8,079,461 B2 * | 12/2011 | Masuda | ............... | G03G 15/161 198/464.1 |
| 8,604,776 B2 * | 12/2013 | Lynn | ................... | G01M 13/023 324/160 |
| 8,888,194 B2 * | 11/2014 | Killion | .................. | E01C 23/122 299/1.5 |
| 9,018,544 B2 * | 4/2015 | Turner | ................ | G01G 19/005 177/1 |
| 9,267,446 B2 * | 2/2016 | Killion | .................... | F02D 29/00 |
| 9,464,391 B2 * | 10/2016 | Killion | .................. | E01C 23/127 |
| 9,939,310 B2 * | 4/2018 | Beltramin | .............. | G01G 19/04 |
| 9,957,675 B2 * | 5/2018 | Marsolek | ............. | E01C 23/088 |
| 10,023,397 B1 * | 7/2018 | Brown | .................. | B65G 43/10 |
| 2016/0168807 A1 | 6/2016 | Schafer et al. | | |
| 2016/0177521 A1 | 6/2016 | Laugwitz et al. | | |
| 2016/0341595 A1 | 11/2016 | Marsolek et al. | | |
| 2017/0009408 A1 | 1/2017 | Marsolek et al. | | |
| 2017/0053220 A1 | 2/2017 | Marsolek et al. | | |

* cited by examiner

SYSTEM AND METHOD FOR MANAGING SPEED OF COLD PLANER CONVEYOR BELT

TECHNICAL FIELD

The present disclosure relates generally to a cold planer and, more particularly, to a system and method for managing the speed of a cold planer conveyor belt.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum, and conveyors. The milling drum, fitted with cutting tools, is rotated through a suitable interface with the engine to break up the surface of the roadway. The broken up roadway material is deposited by the milling drum onto the conveyors, which transfer the broken up material into haul trucks for removal from the worksite. As haul trucks are filled, they are replaced with empty haul trucks. The filled trucks transport the broken up material to a different location to be reused as aggregate in new asphalt or otherwise recycled. This transport process repeats until the milling process is finished.

Operators may wish to coordinate the timely arrival of empty haul trucks at the milling site with the pace of the milling process in order to improve the overall efficiency of the operation. On one hand, having too few empty trucks at the milling site can lead to increased down time when an operator must stop the cold planer to wait for an empty truck to arrive. On the other hand, too many empty trucks at the milling site can result in the wasteful under-utilization of resources. Cold planer operators typically communicate with a truck dispatcher at a material processing plant in an attempt to coordinate the movement of trucks to and from the jobsite. However, calls to the dispatcher from jobsite personnel may not always provide the dispatcher with enough information or enough time to efficiently coordinate movement of the trucks to and from the jobsite. Accurate, real-time measurement of the amount of asphalt reclaimed by the milling process of a cold planer is also desirable as a method to ensure that each individual hauling truck is not overloaded. Overloading of haul trucks may lead to violations of government regulations on maximum allowable loads for transport along public roads, as well as premature wearing of the haul trucks.

One attempt to monitor the production of a milling machine is disclosed in U.S. Patent Application Publication No. 2008/0216021 A1 of Berning et al. that published on Sep. 4, 2008 ("the '021 publication"). In particular, the '021 publication discloses a system for monitoring the operating parameters of the milling machine, the loading of a haul truck, and the surfaces in front of and behind a milling rotor of the milling machine. The system includes a number of sensors configured to measure operating parameters, including ambient conditions, engine parameters, and the position of a number of actuators that are configured operate tools and implements of the milling machine. The system also includes a number of cameras configured to observe the loading of milled material into a haul truck via a conveyor system, an unmilled surface in front of the milling rotor, and a milled surface behind the milling rotor. A processing unit transmits data from the sensors to a memory for data storage, as well as to a display in an operator station of the milling machine. A number of switches associated with the display allow the operator to select which parameters and camera feeds to observe on the display while operating the milling machine. The processing unit can establish a remote data transmission connection in order to communicate data from the sensors and cameras with a control center or another machine.

While the system of the '021 publication may allow for the observation of some milling parameters, it may not be optimum. In particular, information transmitted by the system of the '021 publication may not always provide accurate, real-time information. Further, the cameras may only allow for the observance of qualitative information, which may not be quickly and/or easily analyzed by offboard entities for other purposes. A lack of an accurate, real-time measurement of the actual conveyor belt speed in the conveyor system that transports milled and reclaimed asphalt material from the milling tool of the cold planer to the hauler truck also restricts the ability of existing systems to monitor the precise amounts of material being dumped into the hauler truck.

The disclosed system and method for managing the speed of a cold planer conveyor belt solves one or more of the problems set forth above and/or other problems in the art.

SUMMARY

In one aspect, the present disclosure is related to a system for determining and controlling a speed of a conveyor belt configured for transferring material from a source of the material to a haul vehicle. The system includes a motor and associated head pulley shaft operatively coupled to a conveyor belt head pulley configured for driving the conveyor belt. The motor is connected to a conveyor belt tensioner block configured to enable adjustment of a tension in the conveyor belt, and the head pulley shaft is rotatably supported within the conveyor belt tensioner block. A speed ring gear is mounted on the head pulley shaft and located at least partially within a bore through the conveyor belt tensioner block. The speed ring gear includes a plurality of teeth around an outer circumference thereof, and a speed sensor is mounted on the conveyor belt tensioner block in a position radially outward from the teeth of the speed ring gear as the speed ring gear and head pulley shaft rotate within the bore through the belt tensioner block. The speed sensor is configured to generate signals indicative of the speed of rotation of the head pulley shaft and speed ring gear. A system controller is in electronic communication with the sensor and configured to determine a speed of the conveyor belt from the speed of rotation of the head pulley shaft and speed ring gear, and control the speed of the conveyor belt to control an amount and rate of transfer of material along the conveyor belt from the source of material to the haul vehicle during a time period.

In another aspect, the present disclosure is related to a method of retrofitting a cold planer to include a system for accurately determining and controlling a real-time speed of movement of a conveyor belt of the cold planer configured for transferring material from a milling cutter of the cold planer to a haul vehicle. The conveyor belt is supported in an endless loop around a plurality of roller assemblies and driven by a motor and associated head pulley shaft rotatably supported in a central axial bore through a belt head tensioner block configured for adjusting a tension of the conveyor belt. The head pulley shaft is operatively connected to a belt head pulley and a belt head roller assembly at a distal end of the conveyor belt. The method includes disassembling the belt head tensioner block, motor, and associated head pulley shaft from the belt head pulley and belt head roller assembly at the distal end of the conveyor belt, machining a recess in an outer peripheral surface of the belt head tensioner block for mounting a speed sensor in a fixed position radially outward from the central axial bore through the belt head tensioner block, mounting the speed sensor in the recess on the belt head tensioner block, and installing a speed ring gear around the head pulley shaft and fixing the speed ring gear to the head pulley shaft. The method further includes reassembling the motor and head pulley shaft to the belt head tensioner block, belt head pulley and belt head roller assembly such that the speed ring gear is positioned within the central axial bore through the belt head tensioner block and teeth of the speed ring gear are positioned radially inward from the speed sensor such that rotation of the head pulley shaft causes the speed sensor to generate a signal indicative of the speed of rotation of the head pulley shaft, belt head pulley, and belt head roller assembly.

In yet another aspect, the present disclosure is directed to a cold planer including a frame, a milling drum connected to the frame, and a conveyor pivotally connected to the frame and configured to load milled material into a haul vehicle. One or more sensors are located onboard the cold planer and configured to generate data regarding at least one of cold planer operating parameters and milled material transferred from the cold planer to the haul vehicle. The cold planer also includes a conveyor belt speed management system for determining and controlling a speed of a conveyor belt of the conveyor configured for transferring material milled from a source of the material by the milling drum to a haul vehicle. The system includes a motor and associated head pulley shaft operatively coupled to a conveyor belt head pulley configured for driving the conveyor belt. The motor is connected to a conveyor belt tensioner block configured to enable adjustment of a tension in the conveyor belt, and the head pulley shaft is rotatably supported within the conveyor belt tensioner block. A speed ring gear is mounted on the head pulley shaft and located at least partially within a bore through the conveyor belt tensioner block, and the speed ring gear includes a plurality of teeth around an outer circumference thereof. A speed sensor is mounted on the conveyor belt tensioner block in a position radially outward from the teeth of the speed ring gear as the speed ring gear and head pulley shaft rotate within the bore through the belt tensioner block. The speed sensor is configured to generate signals indicative of the speed of rotation of the head pulley shaft and speed ring gear. A system controller is in electronic communication with the speed sensor and is configured to determine a speed of the conveyor belt from the speed of rotation of the head pulley shaft and speed ring gear, and control the speed of the conveyor belt to control an amount and rate of transfer of material along the conveyor belt from the source of material to the haul vehicle during a time period.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. The disclosed cold planer may also or alternatively be used to remove cement and other roadway surfaces, or to remove non-roadway surface material such as in a mining operation.

Figure 1:
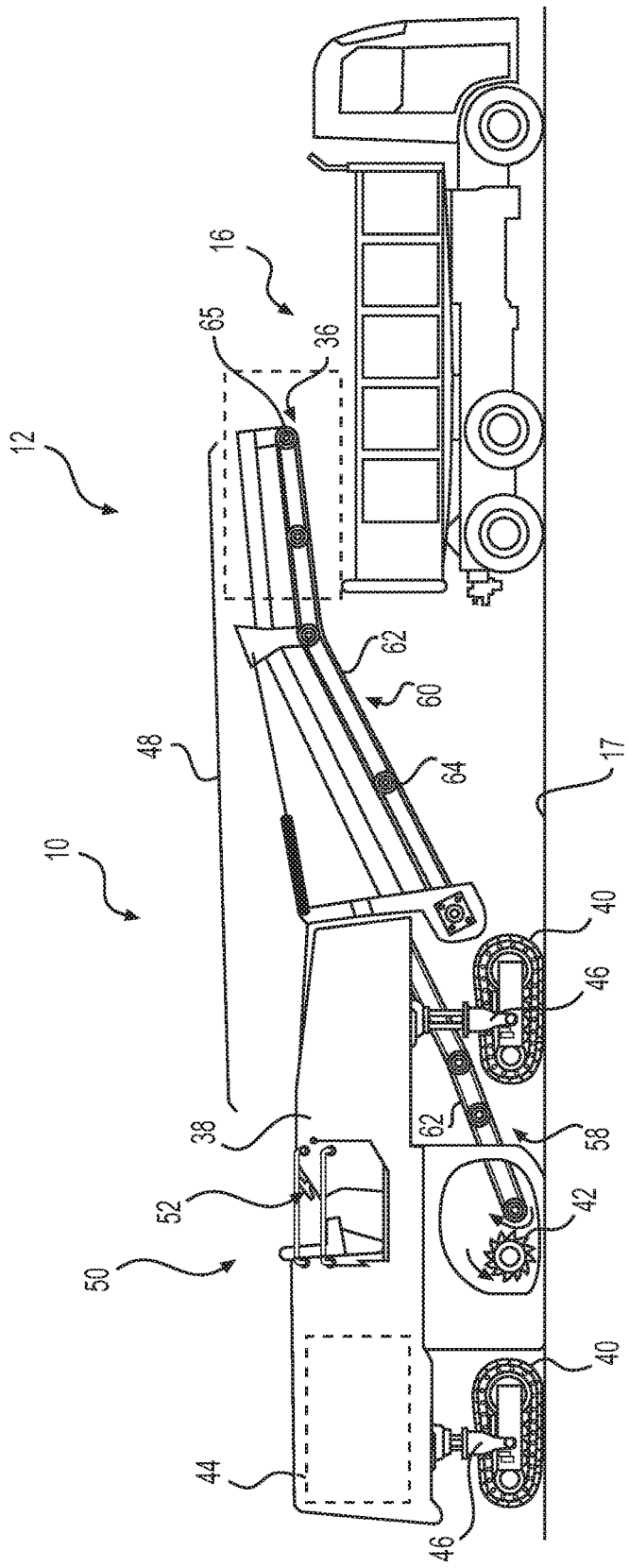
FIG. 1 is a pictorial illustration of an exemplary cold planer and haul vehicle at a work site.

FIG. 1 shows a cold planer 10 used at a worksite 12 to perform a roadway milling operation. As part of the milling operation, cold planer 10 may mill a surface 17 of the roadway and transfer milled material into a first of a plurality of haul vehicles ("haul vehicle") 16. In some situations, a second haul vehicle may be in a standby position near cold planer 10, and a third haul vehicle may be located at or near a plant 20, such as at an associated dispatch facility. It is understood that any number of haul vehicles may be positioned near cold planer 10 (e.g., in the standby position) and/or at an associated plant (e.g., awaiting dispatch). When full, haul vehicle 16 may depart from cold planer 10 to deliver the milled material to plant 20, and another haul vehicle may approach cold planer 10 to replace haul vehicle 16 so the milling operation may continue.

Haul vehicle 16 may be a mobile machine (e.g., dump truck, articulated dump truck, tractor-trailer, etc.) configured to transport material from a first location to a second location. Haul vehicle 16 may also be configured to communicate with plant 20 and/or cold planer 10 during milling operations. For example, haul vehicle 16 may include a communication device 23 configured to exchange information with the plant and/or cold planer 10, a locating device 24 configured to generate a signal indicative of a haul vehicle location, and a controller 26 in electronic communication with the communication device and the locating device. It is understood that haul vehicle 16 may also include input devices (buttons, keyboards, switches, knobs, levers, pedals, etc.) and output devices (e.g., displays, lights, speakers, etc.) for operating the haul vehicle and communicating with the plant and/or cold planer 10, as desired.

FIG. 1 illustrates an exemplary cold planer 10 having a frame 38 supported by one or more traction devices 40, a milling drum 42 rotationally supported under a belly of frame 38, and an engine 44 mounted to frame 38 and configured to drive milling drum 42 and traction devices 40. Traction devices 40 may include either wheels or tracks connected to actuators 46 that are adapted to controllably raise and lower frame 38 relative to a ground surface. It should be noted that, in the disclosed embodiment, raising and lowering of frame 38 may also function to vary a milling depth of milling drum 42 into surface 17. In some embodiments, the same or different actuators 46 may also be used to steer cold planer 10 and or to adjust a travel speed of traction devices 40 (e.g., to speed up or brake traction devices 40), if desired. A conveyor system 48 may be pivotally connected at a leading end to frame 38 and configured to transport material away from milling drum 42 and into a receptacle, such as haul vehicle 16.

Frame 38 may also support an operator station 50. Operator station 50 may house any number of interface devices 52 used to control cold planer 10. In the disclosed example, interface devices 52 may include, among other things, a display and one or more other analog and/or digital input devices. In other embodiments, operator station 50 may be offboard cold planer 10. For example, operator station 50 may embody a remote control, such as a handheld controller, that an operator may use to control cold planer 10 from anywhere on or near a worksite. Operator station 50 may alternatively embody a software program and user interface for a computer, and may include a combination of hardware and software. In other embodiments, cold planer 10 may be autonomous and may not include operator station 50.

The display of interface devices 52 may be configured to render the location of cold planer 10 (e.g., of milling drum 42) relative to features of the jobsite (e.g., milled and/or unmilled parts of surface 17), and to display data and/or other information to the operator. Interface devices 52 may be configured to receive data and/or control instructions from the operator of cold planer 10. Other interface devices (e.g., control devices) may also be possible, and one or more of the interface devices described above could be combined into a single interface device, if desired.

An exemplary interface device 52 may be, for example, an analog input device that receives control instructions via one or more buttons, switches, dials, levers, etc. Interface devices 52 may also or alternatively include digital components, such as one or more soft keys, touch screens, and/or visual displays. Interface devices may be configured to generate one or more signals indicative of various parameters associated with cold planer 10 and/or its surrounding environment based on input received from the operator. For example, an interface device may be configured to receive inputs indicative of milled material density p, a material ID (i.e., a type of material being milled), and parameters of haul vehicle 16 (e.g., dimensions, volume capacity, weight capacity, legal weight limit etc.). An interface device 52 may also be configured to allow the operator to indicate when a receptacle is empty or full, for example, by pressing a button associated with interface device 52. The information received via interface device 52 may be sent to and/or stored in a memory of a controller and used for further processing.

Figure 3:
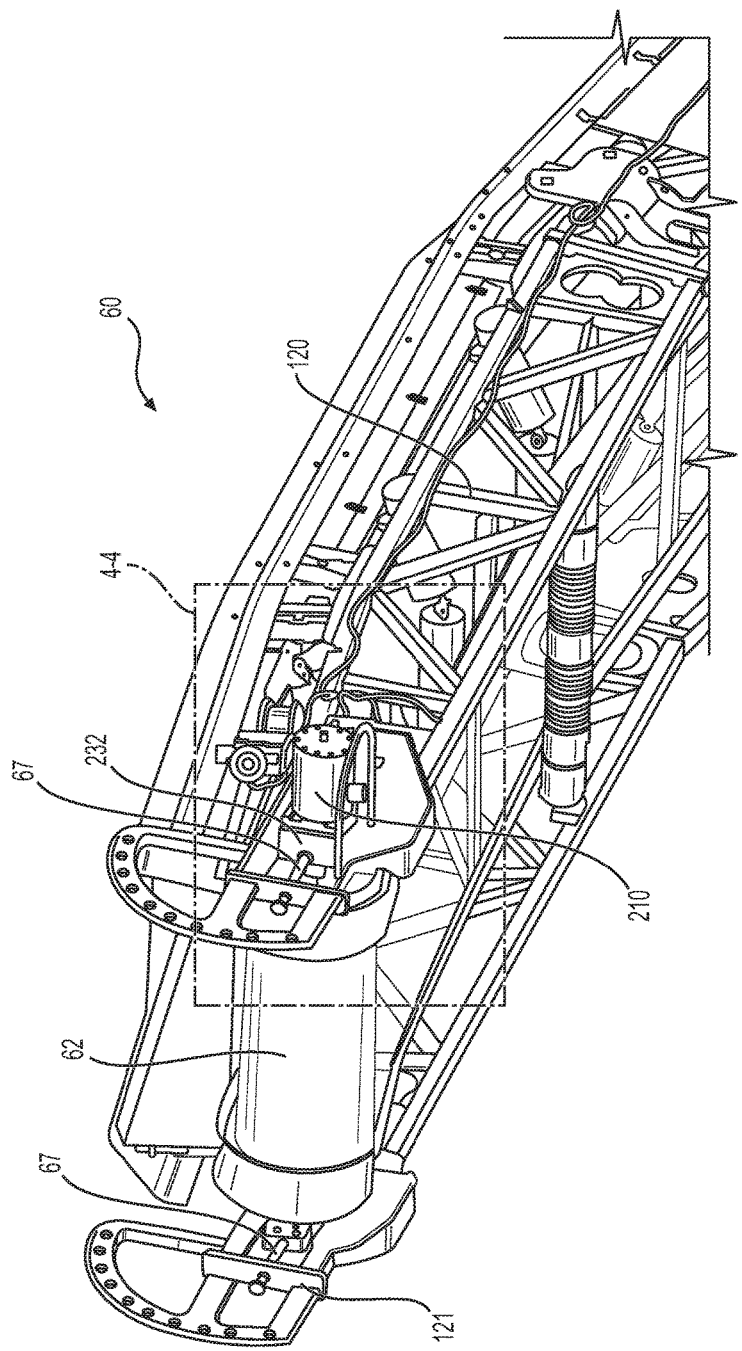
FIG. 3 is a perspective view of a portion of a conveyor system that may be included with the cold planer of FIGS. 1 and 2.
Figure 4:
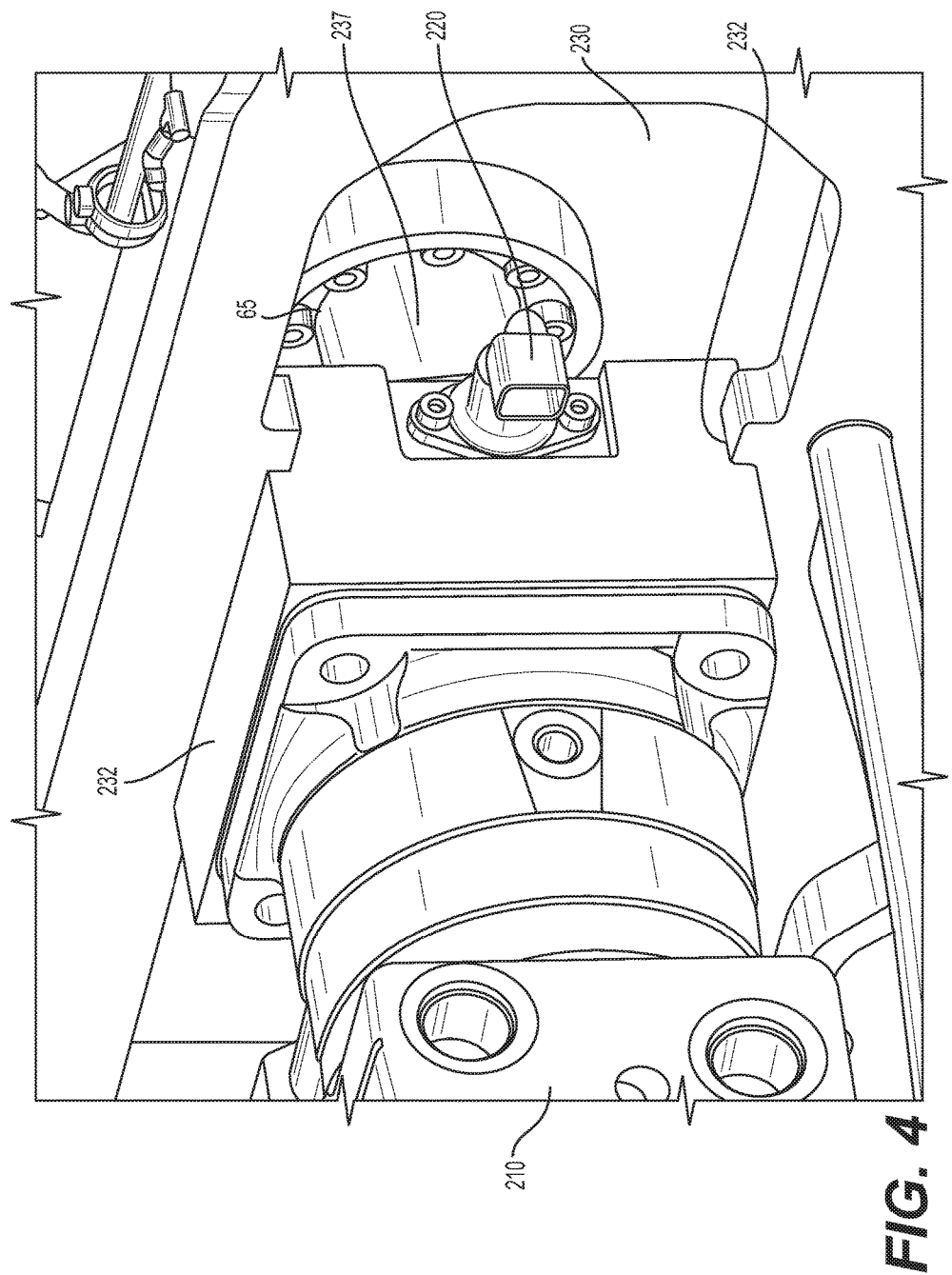
FIG. 4 is an enlarged view of the portion 4-4 in FIG. 3.
Figure 5:
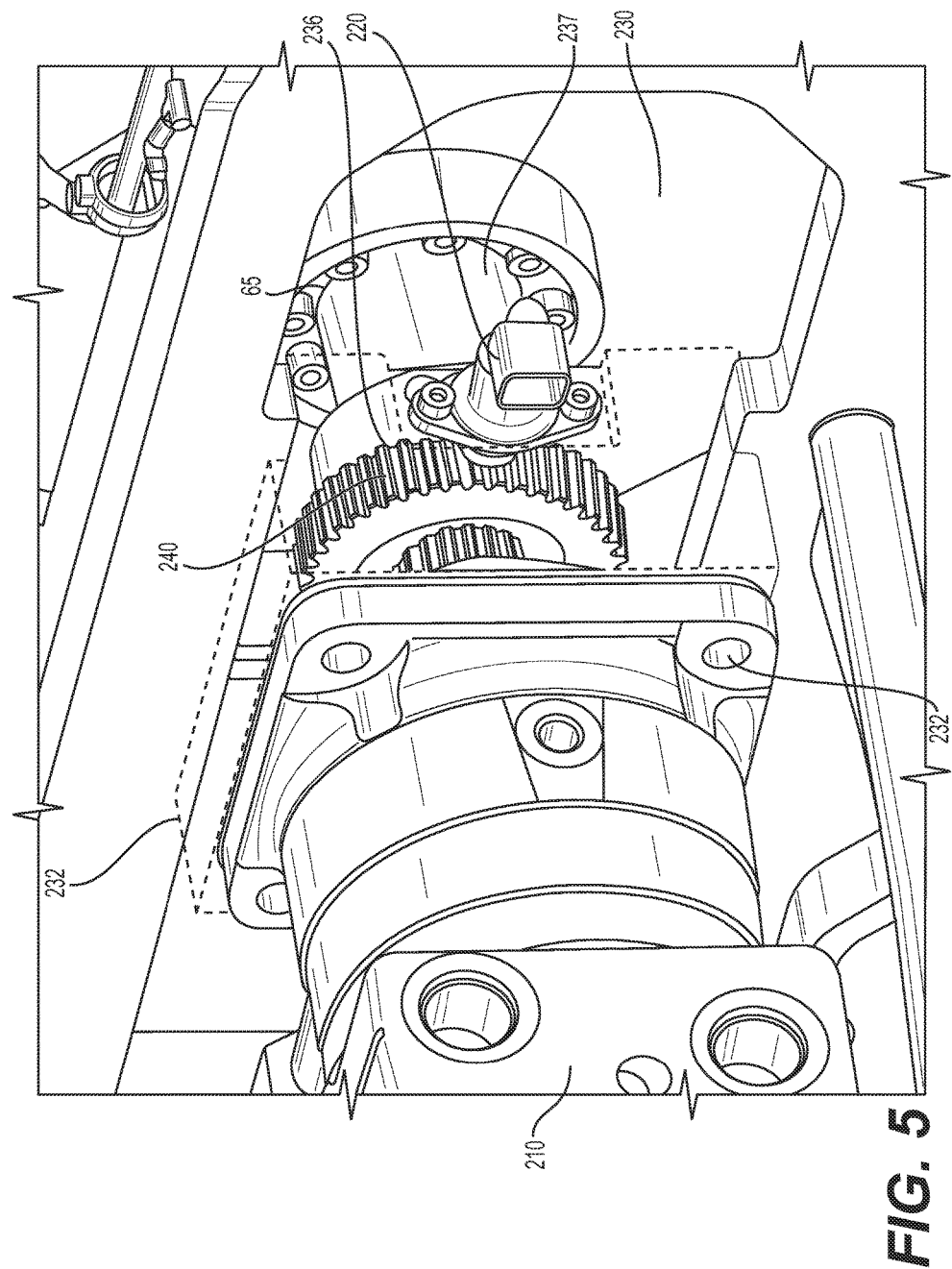
FIG. 5 is the enlarged view of FIG. 4, with portions shown in phantom.

Conveyor system 48 may include a first conveyor 58 adjacent milling drum 42 that is configured to transfer milled material to a second conveyor 60. Conveyors 58 and 60 may each include a conveyor belt 62 that is supported on a plurality of roller assemblies 64, including a belt head roller assembly 65 at a distal end of conveyor 60, and driven by a motor 210 (an example of which is shown in FIGS. 3-5.) A conveyor frame 120, best seen in FIG. 3, may consist of structural members welded or otherwise joined together to form support trusses that make up the backbone of each conveyor belt assembly, supporting multiple roller assemblies 64 and a conveyor belt 62. Motor 210 may embody, for example, a hydraulic motor powered by a hydraulic system (not shown). In other embodiments, motor 210 may be an electric motor or another type of motor. Motor 210 may be powered by engine 44 or by another power source.

In the exemplary embodiment shown in FIGS. 3-5, motor 210 is a hydraulic motor driven by pressurized hydraulic fluid produced by a hydraulic pump driven by engine 44. Hydraulic motor 210 and associated head pulley shaft 237 are mounted and adjustably located relative to conveyor frame 120 through a belt tensioner block 232 positioned adjacent a distal end of conveyor 60. Hydraulic motor 210 may include a motor shaft having an external spline that engages with an internal spline along at least a portion of an axial bore into head pulley shaft 237. Hydraulic motor 210 may be bolted to belt tensioner block 232, and head pulley shaft 237 may be rotatably supported in a central axial bore through belt tensioner block 232. Threaded tensioner rods 67, shown in FIG. 3, may be provided between structural extensions 121 of conveyor frame 120 and belt tensioner block 232. Rotation of tensioner rods 67 adjusts the position of belt tensioner block 232 relative to conveyor frame 120 in order to move hydraulic motor 210, head pulley shaft 237, a belt head pulley 230 driven by head pulley shaft 237, and belt head roller assembly 65 at the distal end of conveyor 60 in a direction parallel to the travel direction of conveyor belt 62 to change the tension of conveyor belt 62 as it moves in an endless loop around roller assemblies 64, including around belt head roller assembly 65.

Figure 2:
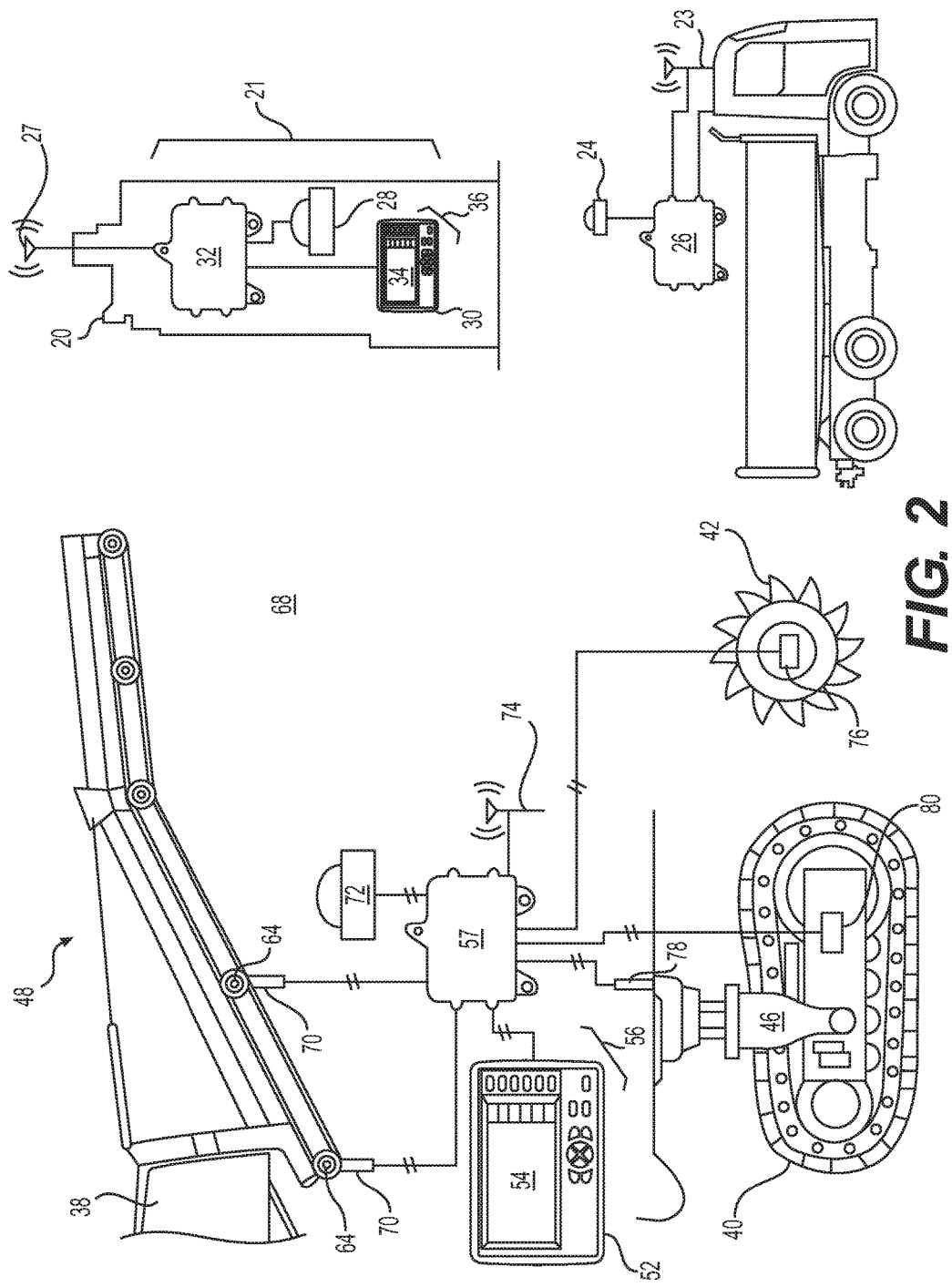
FIG. 2 is a diagrammatic illustration of an exemplary management system for the cold planer and haul vehicle of FIG. 1.

As illustrated in FIG. 2, a material transport management system 68 ("management system") may be associated with cold planer 10 and include elements that cooperate to monitor and analyze material transfer into haul vehicle 16 and facilitate communication between cold planer 10 and plant 20. Management system 68 may facilitate the communication of data from cold planer 10 to plant 20 regarding operating parameters of cold planer 10 and/or milled material transferred into haul vehicle 16. Based on the data, dispatch signals may be generated and communicated to haul vehicle 16 from plant 20 in order to facilitate the timely arrival of haul vehicle 16 to a worksite, as well as to provide instructions for transporting milled material away from the worksite.

Elements of management system 68 may cooperate to generate data regarding cold planer 10 and the transference of material into haul vehicle 16, and communicate the data to plant 20. For example, management system 68 may determine a location of cold planer 10, a rate of material transfer $\Delta$ (e.g., a mass flow rate fit and/or a volume flow rate V, weight per unit of time, a number of haul vehicles per unit time, etc.), a total weight $W_m$ ("weight") of milled material that has been transferred, a fill level $\Sigma$ of haul vehicle 16, an amount of remaining time $T_F$ until haul vehicle 16 is full, and/or other statistical information that may be used by an operator of cold planer 10 and/or by plant 20 to determine when to dispatch haul vehicles. Elements of management system 68 may include interface devices 52, one or more sensors 70, one or more conveyor belt speed sensors 220 (see FIG. 4), a locating device 72, a communication device 74, and controller 57 electronically connected with each of the other elements. Information, including the rate of material transfer $\Delta$, the weight $W_m$, the fill level $\Sigma$, the remaining time $T_F$, and the location of cold planer 10 may be shown to the operator of cold planer 10 via display 54 and/or transmitted to plant 20 via communication device 74 for further processing.

Sensors 70, 220 may include one or more sensors and/or systems of sensors configured to generate signals indicative of cold planer operating parameters and/or the rate of material transfer into haul vehicle 16 via conveyor system 48. In one embodiment, for example, sensors 70, 220 may include a belt scale and belt speed sensor configured to generate signals that may be used to determine how much material is on conveyor system 48 and at what rate Δ the material is being transferred into haul vehicle 16. In another embodiment, sensors 70 may generate signals indicative of a power and speed of motor 66, such as a hydraulic pressure sensor and a motor speed sensor. Sensors 70 may alternatively include an electrical voltage sensor or another type of sensor configured to measure the power output of motor 66. The signals generated by sensors 70 may be utilized by controller 57 in conjunction with other sensed or known parameters (e.g., belt speed, conveyor incline, hydraulic fluid flow rate, motor speed, motor displacement, electrical resistance, electrical current, etc.) to determine and control the rate of material transfer Δ into haul vehicle 16.

As shown in FIGS. 3-5 of the present disclosure, an exemplary embodiment enables accurate, real-time measurements of the speed of conveyor belt 62. The exemplary embodiment may include a speed sensor 220 configured and operatively positioned to generate a signal indicative of the rate of rotation of head pulley shaft 237, belt head pulley 230 and belt head roller assembly 65 located at a distal end of conveyor 60. As shown in FIG. 1, conveyor 60 may include conveyor belt 62 extending in a continuous loop around multiple roller assemblies 64, including around belt head roller assembly 65. Speed sensor 220 may be mounted in a recess formed in an existing conveyor belt tensioner block 232 mounted adjacent belt head pulley 230 at the distal end of conveyor 60. Threaded adjuster rods 67 may extend between extension 121 of conveyor frame 120 and conveyor belt tensioner block 232, thereby allowing for adjustments to the position of belt tensioner block 232 relative to conveyor frame 120.

As shown in FIGS. 4 and 5, head pulley shaft 237 may extend from hydraulic motor 210 and through belt tensioner block 232 to be drivingly coupled to belt head pulley 230, which is operatively coupled to belt head roller assembly 65. Head pulley shaft 237 may be rotatably supported in a central axial bore through belt tensioner block 232, and by bearing surfaces in belt tensioner block 232 such that adjustment of the position of belt tensioner block 232 relative to conveyor frame 120 by turning adjuster rods 67 in one direction or another results in movement of hydraulic motor 210, belt head pulley 230, and belt head roller assembly 65 to either tighten or introduce slack into conveyor belt 62. Belt tensioner block 232 may be positioned on at least one lateral side of a distal end of conveyor 60. In some exemplary embodiments, a separate belt tensioner block 232 may be positioned on both sides of the distal end of conveyor 60, with head pulley shaft 237 rotatably supported in each of the belt tensioner blocks. In other exemplary embodiments, only one belt tensioner block 232 is provided on one side of the conveyor, rotatably supporting a proximal end of head pulley shaft 237 and motor 210, while a distal end of head pulley shaft 237 may be supported in a bearing assembly on an opposite side of the conveyor.

Figure 6:
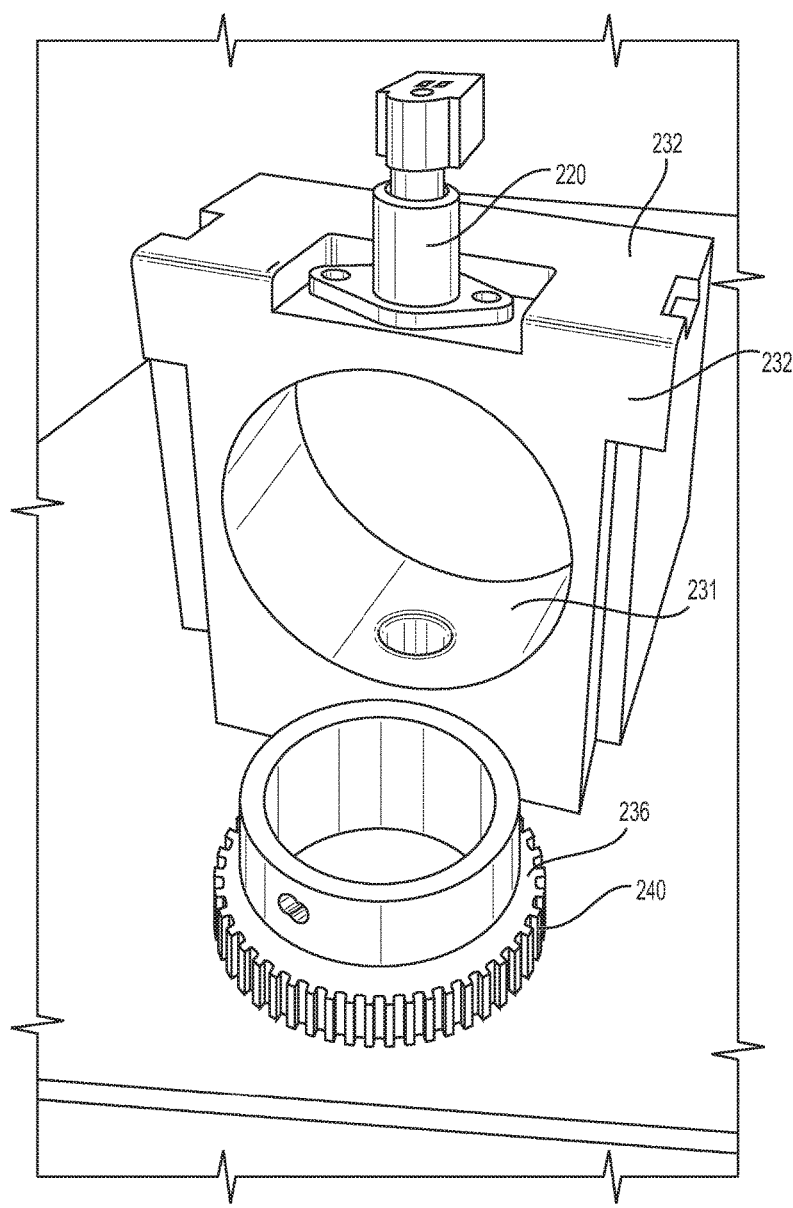
FIG. 6 is a perspective view of a disassembled belt tensioner block and speed ring gear before mounting on a motor drive shaft for the conveyor system shown in FIG. 3.

In a retrofitting process according to various implementations of this disclosure, belt tensioner block 232 may be disassembled from belt head pulley 230 and belt head roller assembly 65, and removed from the distal end of conveyor frame 120, and motor 210 and head pulley shaft 237 may be removed from belt tensioner block 232. A speed ring gear 236 may then be installed around head pulley shaft 237 to fit within a central axial bore 231 through belt tensioner block 232, as seen in FIGS. 4-6. Speed ring gear 236 may be a timing gear with a precisely known number of teeth and pitch between each of the teeth such that detection of each of the teeth as the speed ring gear rotates will provide an accurate measurement of the speed of rotation of speed ring gear 236. Speed ring gear 236 may be attached to head pulley shaft 237 with set screws, splines, or other means, and when mounted on head pulley shaft 237 within belt tensioner block 232, teeth 240 of speed ring gear 236 are detectable by speed sensor 220 mounted on belt tensioner block 232 as speed ring gear 236 and head pulley shaft 237 rotate within central axial bore 231 through belt tensioner block 232. A recess may be machined into an outer surface of belt tensioner block 232 to provide a seating surface for speed sensor 220, and to position speed sensor 220 at the proper spacing from teeth 240 of speed ring gear 236. Alternatively, belt tensioner block 232 may be replaced with a belt tensioner block with pre-machined features for the sensor to enable faster assembly.

Speed sensor 220 may be configured to provide a signal indicative of the speed of rotation of head pulley shaft 237 and speed ring gear 236 when hydraulic motor 210 is driving conveyor 60. In a typical arrangement including a belt tensioner block mounted at a distal end of a conveyor system, central axial bore 231 through belt tensioner block 232 for rotatably supporting head pulley shaft 237 is already large enough to accommodate speed ring gear 236 mounted on head pulley shaft 237. The only modification needed to an existing belt tensioner block 232 to add a conveyor belt speed management system according to various embodiments of this disclosure is to machine a recess of the proper size and depth to mount speed sensor 220 at the proper distance from teeth 240 of speed ring gear 236 mounted on head pulley shaft 237. Speed sensor 220 may be a magnetic sensor such as a Hall-effect type sensor, which is a transducer that varies its output voltage in response to a magnetic field. Such a device requires that the speed ring gear be made from a ferritic material. Other magnetic sensors may include variable-reluctance magnetic sensors, eddy-current killed oscillator (ECKO) sensors and Wiegand sensors. Alternative embodiments may include reflective optical sensors and optical interrupter sensors such as optical encoders.

Once speed ring gear 236 has been mounted on head pulley shaft 237, and motor 210 and head pulley shaft 237 are reassembled to belt tensioner block 232, belt head pulley 230, and belt head roller assembly 65, belt tensioner block 232 also inherently forms a protective outer housing surrounding speed ring gear 236 and maintaining the proper distance between teeth 240 and speed sensor 220. During operation of conveyor 60, as hydraulic motor 210 rotates head pulley shaft 237, and accordingly belt head pulley 230 and belt head roller assembly 65, speed sensor 220 detects the passing of each of teeth 240 on speed ring gear 236. Controller 57 and one or more associated memories may be configured to store, retrieve, and utilize information on the number of teeth 240 and pitch of the teeth on speed ring gear 236 to determine the rate of rotation of speed ring gear 236, and hence the rate of rotation of belt head pulley 230 and belt head roller assembly 65 at the distal end of conveyor 60. Controller 57 may be configured to receive the signal from speed sensor 220 and use that real-time information pertaining to the precise speed of movement of conveyor belt 62 to determine and control the rate of material transfer Δ into haul vehicle 16.

Sensors 70 may alternatively embody other types of sensors that are configured to determine the amount of material being transferred by conveyor system 48 without contacting any moving parts of conveyor system 48. For example, sensors 70 may include a radioactive detection system, a laser scanning system, an optical scanner, a camera, and/or an ultrasonic sensor that is configured to generate a signal indicative of an amount of material (e.g., an area or volume) that has been milled and subsequently transferred via conveyor system 48. Signals from sensors 70 may be used in conjunction with additional parameters (e.g., ground speed, belt speed as determined by speed sensor 220, milling time, etc.) to determine and control a volume of material transferred into haul vehicle 16.

In some embodiments, management system 68 may include one or more additional sensors in electronic communication with controller 57. For example, management system 68 may include a milling drum speed sensor 76, a milling drum depth sensor 78, and a ground speed sensor 80. Milling drum speed sensor 76 may be a magnetic pickup or other type of sensor configured to generate a signal indicative of a rotational speed of milling drum 42. Milling drum depth sensor 78 may be associated with actuators 46 and configured to generate a signal indicative of a height of frame 38 above surface 14, which may be used to determine the depth of milling drum 42 below surface 14 based on known offsets between milling drum 42 and frame 38. Ground speed sensor 80 may be a magnetic pickup or other type of sensor associated with traction devices 40 or another drive component of cold planer 10 (e.g., engine 44, a transmission, etc.). Ground speed sensor 80 may be configured to generate a signal indicative of a ground speed of cold planer 10. Signals generated by sensors 76-80 may be utilized by controller 57 in conjunction with signals generated by sensors 70, and speed sensor 220 to determine and control the rate of material transfer $\Delta$ into haul vehicle 16.

Locating device 72 may be configured to generate a signal indicative of a geographical position of the cold planer 10 relative to a local reference point, a coordinate system associated with the work area, a coordinate system associated with Earth, or any other type of 2-D or 3-D coordinate system. For example, locating device 72 may embody an electronic transponder configured to communicate with one or more satellites, or a local radio or laser transmitting system used to determine a relative geographical location of itself. Locating device 72 may receive and analyze high-frequency, low-power radio or laser signals from multiple locations to triangulate a relative 3-D geographical position. The signal indicative of this geographical position may be communicated from locating device 72 to controller 57 for further processing.

Communication device 74 may include hardware and/or software that enables sending and receiving of data messages between controller 57 and plant 20. The data messages may be sent and received via a direct data link and/or a wireless communication link, as desired. The direct data link may include an Ethernet connection, a connected area network (CAN), or another data link known in the art. The wireless communications may include one or more of satellite, cellular, Bluetooth, WiFi, infrared, and any other type of wireless communications that enables communication device 74 to exchange information.

Controller 57 may embody a single microprocessor or multiple microprocessors that include a means for monitoring operator and sensor input, and responsively adjusting operational characteristics of cold planer 10 based on the input. For example, controller 57 may include a memory, a secondary storage device, a clock, and a processor, such as a central processing unit or any other means for accomplishing a task consistent with the present disclosure. Numerous commercially available microprocessors can be configured to perform the functions of controller 57. It should be appreciated that controller 57 could readily embody a general machine controller capable of controlling numerous other machine functions. Various other known circuits may be associated with controller 57, including signal-conditioning circuitry, communication circuitry, and other appropriate circuitry. Controller 57 may be further communicatively coupled with an external computer system, instead of or in addition to including a computer system, as desired.

Controller 57 may be configured to determine and control the rate of material transfer $\Delta$ into haul vehicle 16, an amount of material yet to be milled, and an ID of material being transferred into haul vehicle 16 based on one or more of the data generated by sensors 70, 76-80, and 220, and the location of cold planer 10. For example, controller 57 may receive the signals from sensors 70 and determine the mass m of material on belt 62 based on the signals. Using the mass m in conjunction with other information received from sensors 70, 76-80, and speed sensor 220 (e.g., belt speed, ground speed, etc.), controller 57 may be configured to determine the mass flow rate $\dot{m}$ of material being transferred by conveyor system 48 into haul vehicle 16. Controller 57 may continually determine the mass flow rate $\dot{m}$ and determine the total weight $W_m$ of material transferred by multiplying the mass flow rate $\dot{m}$ by an elapsed period of milling time and summing the total over a period of conveying time. Controller 57 may be configured to determine a speed of the conveyor belt from the speed of rotation of the head pulley shaft and speed ring gear, and control the speed of the conveyor belt to control an amount and rate of transfer of material along the conveyor belt from the source of material to the haul vehicle during a time period.

In embodiments where sensors 70 are configured to generate signals indicative of an area or volume V of milled material (i.e., instead of the mass m), controller 57 may be configured to determine the rate of material transfer $\Delta$ into haul vehicle 16 based on the area or volume V of material transferred. For example, controller 57 may be configured to determine the area or volume V of material transferred based on the signals from sensors 70, and multiply the area by a linear speed (e.g. belt speed—such as determined by speed sensor 220, ground speed, etc.) or dividing the volume V by a milling time, respectively, to determine the volume flow rate $\dot{V}$. Controller 57 may determine the total weight $W_m$ of milled material by multiplying the volume flow rate $\dot{V}$ by a period of milling time and the density $\rho$ of the milled material, and summing the total over a period of conveying time. The density $\rho$ may be received by controller 57 from input device 56 or may be stored within its memory.

Controller 57 may be configured to determine the fill level $\Sigma$ of haul vehicle 16 based on the mass flow rate $\dot{m}$, the volume flow rate $\dot{V}$, and/or the total weight $W_m$ of the milled material and known features of haul vehicle 16 (e.g., geometry, volumetric capacity, shape, weight capacity, etc.) received via input device 56 or retrieved from its memory. In other embodiments, features of haul vehicle 16 and/or other information (e.g., the density $\rho$ of milled material) may be automatically received from haul vehicle 16 via communication device 74. Using this information, controller 57 may be configured to determine the remaining time $T_F$ until haul vehicle 16 is full (i.e., reaches a threshold fill level, a desired fill level, a maximum fill level, etc.). For example, controller 57 may compare the mass flow rate $\dot{m}$, volume flow rate $\dot{V}$, total weight $W_m$, and/or fill level $\Sigma$ to a target value over a period of conveying time, and determine how much time remains until haul vehicle 16 will become full.

Based on one or more of the rate of material transfer $\Delta$, the total weight $W_m$, and the information received from locating device 72, controller 57 may be configured to determine the amount of material yet to be milled. For example, controller 57 may track the location data of cold planer 10 during the milling operation and determine an area of worksite 12 that has been milled based on the location data and an area yet to be milled based on known geographic information of worksite 12. Using this information and information from sensors 76-80, and 220, controller 57 may determine a volume and/or a weight of material yet to be milled and removed from a source of the material, such as an extent of deteriorated asphalt pavement. Alternatively, controller 57 may determine the amount of material yet to be milled based on a difference between known milling operation plans (e.g., a known area volume, weight, etc., to be milled) and the total weight $W_m$ and/or other information.

Controller 57 may be configured to communicate one or more of the fill level $\Sigma$, the remaining time $T_F$ until haul vehicle 16 is full, the rate of material transfer $\Delta$ (e.g., volume flow rate $\dot{V}$ or mass flow rate $\dot{m}$), the total weight $W_m$, and/or other information to plant 20 via communication device 74. Controller 57 may be configured to show this information to the operator of plant 20 via display 34 of an interface device 30 associated with plant 20 and/or communicate it to controller 32 for further processing. In this way, operators of plant 20 and/or controller 32 may be able to monitor and control dispatching of haul vehicle 16 with accurate data received in real-time.

Management system 68 may also include locating device 28, interface device 30, and controller 32 associated with plant 20. For example, controller 32 may be configured to receive the data from controller 57 via communication device 27 for further processing. Controller 32 may show the data to the operator of plant 20 via display 34, thereby allowing the operator to generate dispatch signals for one or more haul vehicle 16 based on the data received in real-time. Controller 32 may also or alternatively generate the dispatch signals automatically based on the data received from controller 57, thereby allowing the operator of plant 20 to focus on other tasks.

For example controller 32 may receive the location of cold planer 10 and the data via communication device 27 and determine a distance between plant 20 and cold planer 10 in conjunction with information received from locating device 28. The data from cold planer 10 may include the ground speed of cold planer 10, a heading of cold planer 10 (e.g., a compass direction), and/or multiple location and time data points that may be used to determine a heading of cold planer 10. Based on this information, controller 32 may be configured to determine the distance between cold planer 10 and plant 20, as well as a travel time of a haul vehicle traveling from plant 20 to cold planer 10 based on the distance and heading of cold planer 10. In other embodiments, the distance and travel time between cold planer 10 and plant 20 may be determined by controller 57 and received as an input by controller 32 via communication devices 74 and 27.

Controller 32 may also be configured to select a travel route from plant 20 to cold planer 10 based on information received from locating device 28 in conjunction with one or more of the data received from cold planer 10, the distance from plant 20 to cold planer 10, and the travel time. For example, controller 32 may select a route that ensures the travel time is within a desired limit or threshold, such as the remaining time $T_F$ until haul vehicle 16 is full. Other time thresholds may be used, if desired. Controller 32 may be configured to determine the desired travel route based also on known geographical, terrain, and road information that is stored within its memory, associated with locating device 28 (e.g., stored within a memory of locating device 28), or received via communication device 27.

Controller 32 may also be configured to track a number of haul vehicles 16 currently located at worksite 12 and determine a desired number of haul vehicles 16 to be located at worksite 12 in order to ensure a continuous workflow. For example, controller 32 may track the location of each haul vehicle 16 based on signals generated by locating devices 24 associated with each haul vehicle 16, and determine the number of vehicles currently located at worksite 12 based on the signals and the known location of worksite 12. Based on the rate of material transfer $\Delta$ received from cold planer 10 as calculated using accurate, real-time conveyor belt speed information derived from signals produced by speed sensor 220, controller 32 may determine a rate at which milled material is hauled away from worksite 12, and determine a rate at which empty trucks (e.g., having known weight and/or volume capacities) should be delivered to worksite 12 in order to accommodate the rate of material transfer $\Delta$. Based on the travel time of haul vehicles 16 from plant 20 to cold planer 10 and the rate of material transfer $\Delta$, controller 32 may determine a desired number of haul vehicles 16 to be located at worksite 12 in the standby position at any given time. When the number of haul vehicles 16 currently located at worksite 12 is less than the desired number of haul vehicles 16, controller 32 may determine that additional haul vehicles 16 should be sent to worksite 12 and dispatch additional haul vehicles 16. In this way, operation of cold planer 10 may be continuous during a shift and may not have to be paused to wait for empty haul vehicles 16.

When controller 32 determines that additional haul vehicles 16 should be sent to worksite 12, controller 32 may generate a first dispatch signal indicative of a request for one or more empty haul vehicles 16 to travel to cold planer 10 at worksite 12. Controller 32 may direct the first dispatch signal to a particular one or more of haul vehicles 16 via communication device 27, and the dispatch signal may include one or more of the location of cold planer 10, the desired travel route, the distance to cold planer 10, and the travel time. The dispatch signal may include other data and/or instructions, if desired.

When, for example, haul vehicle 16 is full and cold planer 10 departs to return to plant 20, controller 32 may be configured to generate a second dispatch signal based on data received from cold planer 10 and/or other information. For example, controller 32 may receive the material ID associated with the milled material loaded into haul vehicle 16 from cold planer 10, and determine a location to deliver the milled material based on the material ID. When plant 20 has available space to receive material having the ID associated with the milled material in haul vehicle 16, controller 32 may direct haul vehicle 16 via the second dispatch signal to return to plant 20. In some embodiments, controller 32 may direct haul vehicle 16 to a particular location within plant 20 based on the associated material ID.

In other situations, however, controller 32 may determine that plant 20 cannot receive additional material having the associated ID and direct haul vehicle 16 to an alternate location via the second dispatch signal. For example, controller 32 may determine that plant 20 cannot receive additional material based on known stock quantities, the total weight $W_m$ of milled material having the associated ID, a number of full haul vehicles 16 in transit, the rate of material transfer $\Delta$, etc. In these situations, the second dispatch signal may include details regarding the alternate location (e.g., the grid location, a travel route, a travel time, etc.). It should be noted that first and second dispatch signals may be generated manually by the operator of plant 20 using an input device 36.

The precise, real-time measurement of the speed of conveyor belt 62, as determined from the signals generated by speed sensor 220, enables an accurate real-time determination by controller 57 of the amount of milled material actually being deposited into haul vehicle 16 at any point in time or during any defined period of time. Controller 57 may also use the information provided by speed sensor 220 to determine whether changes should be made to the depth of cut for milling drum 42, for example, by sending command control signals to actuators 46 to raise or lower frame 38, and whether a speed of rotation of motor 210 and head pulley shaft 237 should be changed in order to change the speed of conveyor belt 62. Moreover, various implementations according to this disclosure include an inexpensive retrofit of an existing conveyor belt drive system to enable the system to provide accurate, real-time data for determining and controlling the speed of movement of a conveyor belt on a cold planer, and thereby a material transfer rate from the cold planer to a haul vehicle. An existing belt tensioner block for a conveyor belt provides an ideal mounting location for a speed ring gear directly mounted to a drive shaft from the motor that drives the conveyor belt. A speed sensor may also be mounted on the belt tensioner block and configured and located to generate signals indicative of the rotational speed of the motor drive shaft based on the rate at which teeth on the speed ring gear pass by the speed sensor.

INDUSTRIAL APPLICABILITY

The disclosed system and method for determining and controlling the real-time speed of a conveyor belt transferring material from a milling cutter into a haul vehicle may be used with any cold planer where accurate measurement of the rate of transfer of material from a source of the material to a haul vehicle is desired. An accurate measurement of the rate of transfer of materials is important for achieving continuous milling operations by managing the transfer of milled materials into each of a succession of haul vehicles. The disclosed system and method may determine the rate of material transfer into a haul vehicle and the location of the cold planer, and communicate this information to a dispatch facility associated with a plant where dispatch signals for haul vehicles may be manually or automatically generated. A controller associated with the plant may generate dispatch signals based on data received from the cold planer in order to ensure the timely arrival of a desired number of haul vehicles to support continuous milling operations of the cold planer. The controller associated with the plant may determine the distance and travel time between the plant and the cold planer and the number of desired haul vehicles, and generate dispatch signals based on this information. A controller associated with the cold planer may determine a material ID associated with the material transferred into the haul vehicle and communicate the material ID to the plant. The plant may generate dispatch signals indicative of a location for the haul vehicle to deliver the milled material based on the material ID.

During operation of cold planer 10, material from surface 17 may be removed by milling drum 42 as cold planer 10 is propelled across surface 17 by traction devices 40. The milled material may be loaded into haul vehicle 16 by conveyor system 48 while an empty haul vehicle waits in a standby position. Each haul vehicle 16 may initially be located at plant 20 or another location awaiting a dispatch signal from dispatch facility 21.

As milled material is loaded into haul vehicle 16, controller 57 of cold planer 10 may generate data regarding at least one of cold planer operating parameters and milled material transferred from cold planer 10 to haul vehicle 16. For example, controller may receive signals from speed sensor 220 mounted on belt tensioner block 232 in proximity to speed ring gear 236 mounted on head pulley shaft 237. Sensors 70 may also provide signals indicative of an amount of milled material on conveyor system 48 and/or being transferred into haul vehicle 16. Controller 57 may receive signals from one or more of sensors 76-80 and 220 indicative of the speed of milling drum 42, the depth of milling drum 42, the speed of conveyor belt 62, and the ground speed of cold planer 10. Based on the signals from one or more of sensors 70, 76-80, and 220, controller 57 may determine the rate of material transfer $\Delta$ (e.g., the mass flow rate $\dot{m}$, the volume flow rate $\dot{V}$, etc.) into haul vehicle 16. Based on the material transfer rate, controller 57 may then determine additional data, such as the total weight $W_m$ of milled material, the fill level $\Sigma$ of haul vehicle 16, and the remaining time $T_F$ until haul vehicle 16 is full.

Controller 57 may also generate cold planer location data during the milling operation based on signals received from locating device 72. The location data may include a geographic position of cold planer 10 and/or the heading of cold planer 10, which may be used to generate further data. For example, controller 57 may determine a material ID of the milled material being transferred into haul vehicle 16 based on the location of cold planer 10. Known locations of different material types may be stored within the memory of controller 57 or received by controller 57 via locating device 72 and/or communication device 74. Controller 57 may associate the material ID with the milled material based on this information.

Controller 57 may also determine an amount of material yet to be milled based on the location data and/or information received from sensors 70, 76-80, and 220. For example, controller 57 may track the position of cold planer 10 during the milling operation based on the signals from locating device 72 and determine an area of worksite 12 that has been already milled. Based on known geographic information of worksite 12, controller 57 may then compare the milled area and the known information of worksite 12 to determine a difference between them as the area yet to be milled. Alternatively, controller 57 may continually determine and track how much material has been milled, such as the total weight $W_m$ of milled material, and compare that amount to known milling operation parameters (e.g., a targeted weight, volume, mass, etc.).

Controller 57 may then communicate the generated data to plant 20 via communication devices 74 and 27. Once the data is received via communication device 27, operators of plant 20 and/or controller 32 of plant 20 may analyze the data and generate dispatch signals (e.g., first and second dispatch signals) to haul vehicles 16. In one example, an operator of plant 20 may view the data in real-time via display 34 and determine when to send additional haul vehicles to worksite 12. The operator may also view the data and determine when to send dispatch signals to, for example, haul vehicle 16 as it returns to plant 20 from cold planer 10.

In another example, controller 32 may receive the data from cold planer 10 via communication device 27 and automatically generate dispatch signals to haul vehicle 16 based on the data. For example, controller 32 may receive the rate of material transfer $\Delta$ from cold planer 10 and determine a rate at which material is being hauled away from worksite 12 (e.g., a number of haul vehicles per unit time, an amount of material per unit time, etc.). Controller 32 may also determine a distance and travel time between plant 20 and cold planer 10 based on the location data received from cold planer 10. Based on this information, controller 32 may be able to determine how quickly material is being hauled away from worksite 12 and how quickly replacement haul vehicles should be sent to worksite 12 to allow for a continuous milling operation.

Controller 32 may determine when to send additional haul vehicles to worksite 12 in order to accommodate the rate at which milled material is being hauled away from worksite 12. That is, as a quantity of material is hauled away or as each or a number of haul vehicles leaves worksite 12, controller 32 may send empty haul vehicles to replace the full haul vehicle(s) so the total number of haul vehicles at worksite 12 remains within a constant or desired range. In some circumstances, controller 32 may determine the travel time from plant 20 to cold planer 10 in order to ensure, for example, haul vehicle 16 can arrive at worksite 12 before the remaining time $T_F$ until haul vehicle 16 is full will expire. As cold planer 10 traverses surface 14 or moves to different locations at worksite 12, the distance between cold planer 10 and plant 20 may continually change. Thus, controller 32 may continually determine the distance and travel time to ensure the timely arrival of haul vehicle 16 and to minimize the amount of time that cold planer 10 must wait for an empty haul vehicle to arrive.

Based on the distance and travel time, controller 32 may then select a travel route between plant 20 and cold planer 10 that will allow a haul vehicle to arrive at cold planer 10 within the desired time limit. Based on the location information received from cold planer 10 and information received via locating device 28 and/or communication device 27, controller may select the travel route. Information received from locating device 28 and/or communication device 27 may include known geographic and road information, as well as current traffic details (e.g., congested areas, closed roads, posted detours, restricted areas, etc.). Such information may also or alternatively be stored within the memory of controller 32 and accessed when determining the desired travel route. In this way, pauses in the milling operation caused by traffic delays may be avoided.

Controller 32 may receive a location signal from each of haul vehicles 16 and track their positions during the milling operation. Based on the location signals, controller 32 may determine how many haul vehicles are at worksite 12 and at plant 20 (and in transit) at any given time. Based on the data from cold planer 10 (e.g., one or more of the material transfer rate $\Delta$, the remaining time $T_F$ until haul vehicle 16 is full, the distance and travel time between plant 20 and cold planer 10, and/or the heading of cold planer 10), controller 32 may determine a desired number of haul vehicles to be located at worksite 12 in order to allow for a continuous milling operation, and compare the desired number to the number of haul vehicles currently located at worksite 12. When the desired number is greater than the current number, controller 32 may increase the rate at which empty haul vehicles are dispatched to worksite 12. When the desired number is less than the current number, controller 32 may reduce the rate at which haul vehicles are dispatched to worksite 12 and, at times, may recall one or more haul vehicles to plant 20.

Based on the data received from cold planer 10 (e.g., the material transfer rate, the amount of material yet to be milled, and the cold planer location) and other information determined by controller 32 (e.g., travel distance and time between plant 20 and cold planer 10, the desire travel route, desired number of haul vehicles, the rate at which to dispatch more haul vehicle etc.), controller 32 may automatically generate first dispatch signals indicative of a request for one or more of haul vehicles 16 to travel to cold planer 10. In this way, operators of plant 20 may be allowed to focus on additional or other tasks while first dispatch signals are generated based on real-time data received from cold planer 10.

When one or more of haul vehicles 16 become full and is returning to plant 20, controller 32 may then generate second dispatch signals indicative of a location for haul vehicles 16 to deliver milled material received from cold planer 10. For example, controller 32 may generate the second dispatch signals based on the material ID associated with the milled material removed by cold planer 10. The material ID may be indicative of the type of material removed from surface 17, and may also correspond to a specified storage location at plant 20. In this way, operators and controller 32 of plant 20 may not have to wait for haul vehicles 16 to return to plant 20 before deciding where to store the milled material. Determining where to send the returning haul vehicle while it is still in transit may allow the haul vehicle to travel directly to that location instead of requiring the material to be inspected or otherwise checked. This may reduce time and effort spent by operators in determining the contents of each haul vehicle 16 and deciding where to store the material. Also, when plant 20 is no longer capable of storing additional material having a particular ID, the second dispatch signal may be sent while haul vehicles 16 are still in transit, allowing them to proceed to an alternate location, as desired.

Several advantages may be associated with the disclosed conveyor belt speed management system. For example, because controller 57 may generate data regarding operation of cold planer 10 and the milled material, this information may be communicated to plant 20 in real-time for use by operators and controller 32 in generating command control signals for operation of cold planer 10 and dispatch signals to haul vehicles 16. Command control signals for operation of cold planer 10 may control the rate of rotation of milling drum 42, the depth of cut of milling drum 42 by controlling the height of frame 38 with actuators 46, the ground speed of cold planer 10, and the rate of rotation of motor 210, and hence the speed of conveyor belt 62. Because the data may include material transfer rate and location information, controller 32 may be able to generate dispatch signals to ensure the desired number of haul vehicles are present near cold planer 10 at worksite 12, and pauses in the milling operation may be avoided or minimized. Also, because controller 57 may determine and communicate the material ID to plant 20, dispatch signals may be generated to haul vehicles returning to plant 20 instructing them of an available location to receive the milled material, thereby reducing confusion and wasted travel time. Further, since controller 32 may automatically generate the dispatch signals, the operators of plant 20 may be able to efficiently focus on more or other tasks.

It will be apparent to those skilled in the art that various modifications and variations can be made to the disclosed conveyor belt speed management system without departing from the scope of the disclosure. Other embodiments of the management system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for determining and controlling a speed of a conveyor belt configured for transferring material from a source of the material to a haul vehicle, the system comprising:
   a motor and associated head pulley shaft operatively coupled to a conveyor belt head pulley configured for driving the conveyor belt;
   the motor being connected to a conveyor belt tensioner block configured to enable adjustment of a tension in the conveyor belt, and the head pulley shaft being rotatably supported within the conveyor belt tensioner block;
   a speed ring gear being mounted on the head pulley shaft and located at least partially within a bore through the conveyor belt tensioner block, the speed ring gear including a plurality of teeth around an outer circumference thereof;
   a speed sensor mounted on the conveyor belt tensioner block in a position radially outward from the teeth of the speed ring gear as the speed ring gear and head pulley shaft rotate within the bore through the belt tensioner block;
   the speed sensor being configured to generate signals indicative of the speed of rotation of the head pulley shaft and speed ring gear; and
   a system controller in electronic communication with the sensor and configured to:
      determine a speed of the conveyor belt from the speed of rotation of the head pulley shaft and speed ring gear, and
      control the speed of the conveyor belt to control an amount and rate of transfer of material along the conveyor belt from the source of material to the haul vehicle during a time period.

2. The system of claim 1, wherein the amount of material being transferred along the conveyor belt is controlled as one or more of a volume per unit of time, a weight per unit of time, and a number of haul vehicles per unit time.

3. The system of claim 1, wherein the system controller is configured to:
   determine an amount of material yet to be removed from a source of material at a particular location based at least in part on an amount of material already transferred along the conveyor belt from the source of material at the particular location to the haul vehicle; and
   transmit information on the amount of material yet to be removed to a plant where the material is received and processed, wherein the information is transmitted wirelessly via a communication device.

4. The system of claim 3, wherein the system controller is configured to:
   determine a material ID associated with the particular location; and
   transmit the material ID to the plant via the communication device.

5. The system of claim 4, wherein:
   the plant includes a display in electronic communication with the system controller via the communication device; and
   the system controller is configured to show one or more of the rate of material transfer, the material ID, the amount of material yet to be removed from the particular location, and the particular location of the source of material to an operator of the plant via the display.

6. The system of claim 4, wherein the plant includes a plant controller in electronic communication with the system controller via the communication device, the plant controller being configured to generate dispatch signals based at least in part on the amount of material already transferred along the conveyor belt from the source of material at the particular location to the haul vehicle.

7. The system of claim 6, wherein the plant controller is configured to generate a first dispatch signal indicative of a request for one or more of a plurality of haul vehicles to travel to the particular location.

8. The system of claim 7, wherein the plant controller is configured to determine the first dispatch signal based on one or more of the rate of material transfer along the conveyor belt, the amount of material yet to be removed from the particular location, and the particular location.

9. The system of claim 8, wherein the plant controller is configured to generate a second dispatch signal indicative of a location for one or more of the plurality of haul vehicles to deliver material from the source of material at the particular location.

10. A method of retrofitting a cold planer to include a system for accurately determining and controlling a real-time speed of movement of a conveyor belt of the cold planer configured for transferring material from a milling cutter of the cold planer to a haul vehicle, the conveyor belt being supported in an endless loop around a plurality of roller assemblies and driven by a motor and associated head pulley shaft rotatably supported in a central axial bore through a belt head tensioner block configured for adjusting a tension of the conveyor belt, and operatively connected to a belt head pulley and a belt head roller assembly at a distal end of the conveyor belt, the method comprising:
   disassembling the belt head tensioner block, motor, and associated head pulley shaft from the belt head pulley and belt head roller assembly at the distal end of the conveyor belt;
   machining a recess in an outer peripheral surface of the belt head tensioner block for mounting a speed sensor in a fixed position radially outward from the central axial bore through the belt head tensioner block;
   mounting the speed sensor in the recess on the belt head tensioner block;
   installing a speed ring gear around the head pulley shaft and fixing the speed ring gear to the head pulley shaft; and
   reassembling the motor and head pulley shaft to the belt head tensioner block, belt head pulley and belt head roller assembly such that the speed ring gear is positioned within the central axial bore through the belt head tensioner block and teeth of the speed ring gear are positioned radially inward from the speed sensor such that rotation of the head pulley shaft causes the speed sensor to generate a signal indicative of the speed of rotation of the head pulley shaft, belt head pulley, and belt head roller assembly.

11. The method of claim 10, wherein the belt head tensioner block is configured to rotatably support a proximal end of the head pulley shaft on one side of the conveyor belt, and a distal end of the head pulley shaft is rotatably supported in a bearing assembly on the opposite side of the conveyor belt.

12. The method of claim 10, wherein the speed ring gear is fixed to the head pulley shaft by one or more set screws.

13. The method of claim 10, wherein the speed ring gear is fixed to the head pulley shaft by one or more splines.

14. The method of claim 10, further including communicatively coupling the speed sensor to a system controller configured to:
determine a speed of the conveyor belt from the signal generated by the speed sensor, and
control the speed of the conveyor belt to control an amount and rate of transfer of material along the conveyor belt from the milling cutter to the haul vehicle during a predetermined time period.

15. The method of claim 14, wherein the system controller is further configured to determine a location of the cold planer; and
transmit the rate of material transfer and the location of the cold planer to a plant where the material is processed and additional haul vehicles can be dispensed to pick up material from the cold planer.

16. The method of claim 10, wherein the rate of material transfer is one or more of a volume per unit of time, a weight per unit of time, and a number of haul vehicles per unit time.

17. The method of claim 10, wherein the speed sensor is one of a magnetic speed sensor or an optical speed sensor.

18. A cold planer, comprising:
a frame;
a milling drum connected to the frame;
a conveyor pivotally connected to the frame and configured to load milled material into a haul vehicle;
one or more sensors located onboard the cold planer and configured to generate data regarding at least one of cold planer operating parameters and milled material transferred from the cold planer to the haul vehicle; and
a conveyor belt speed management system for determining and controlling a speed of a conveyor belt of the conveyor configured for transferring material milled from a source of the material by the milling drum to a haul vehicle, the system comprising:
a motor and associated head pulley shaft operatively coupled to a conveyor belt head pulley configured for driving the conveyor belt;
the motor being connected to a conveyor belt tensioner block configured to enable adjustment of a tension in the conveyor belt, and the head pulley shaft being rotatably supported within the conveyor belt tensioner block;
a speed ring gear being mounted on the head pulley shaft and located at least partially within a bore through the conveyor belt tensioner block, the speed ring gear including a plurality of teeth around an outer circumference thereof;
a speed sensor mounted on the conveyor belt tensioner block in a position radially outward from the teeth of the speed ring gear as the speed ring gear and head pulley shaft rotate within the bore through the belt tensioner block;
the speed sensor being configured to generate signals indicative of the speed of rotation of the head pulley shaft and speed ring gear; and
a system controller in electronic communication with the speed sensor and configured to:
determine a speed of the conveyor belt from the speed of rotation of the head pulley shaft and speed ring gear, and
control the speed of the conveyor belt to control an amount and rate of transfer of material along the conveyor belt from the source of material to the haul vehicle during a time period.

19. The cold planer of claim 18, wherein the speed sensor is one of a magnetic speed sensor or an optical speed sensor.

20. The cold planer of claim 18, wherein the motor is a hydraulic motor.

* * * * *